Patented Feb. 28, 1950

2,499,028

UNITED STATES PATENT OFFICE 2,499,028

RUBBER MOLD AND CUTTING LUBRICANT

Walter G. Kunze, Catonsville, Md.

No Drawing. Application April 9, 1946,
Serial No. 660,861

8 Claims. (Cl. 18—47)

This invention relates to coating materials and more particularly to those suitable for use with metal or non-metal rubber or rubber-like or plastic molding forms and matrices, and the molding processes they are involved in.

In the use of metal rubber molding forms, conditions are met with, that are quite critical and control the making of results satisfactory. For this purpose a dusting or liquid application is used on the surfaces of the metal molding forms that are intended to receive the molten rubber mixture to be formed into a finished article. Ordinarily this application does not permit the molded article formed to come out as satisfactory as wished. In many instances the mixture will adhere to the metal walls of the molding form, and make the removal difficult. When the article is removed, it is subject to tears and marring that spoil it for commercial or artistic uses. The use of the application however, no matter how poor the results, is better than having the molding done without it. The application composition to be satisfactory must have a relatively high melting point to prevent evaporation or deterioration, and it must be chemically inert to the rubber mixture as well as the material of the molding form, it must not have a tendency to form a tarry or carbonaceous residue. Also the application material must not have characteristics that would tend to soil the molded article, the mixture material or the molding form itself. The application materials commonly used have the general disadvantage of being unable to meet these requirements, and the molding or molded article therefore entails special labor and effort to bring it to a suitable finished condition for use. Rubber molding forms are usually highly polished. They have to be broken in, which means that a minute coating of hydrophobic material coats their surfaces so they can be used.

It is an object of this invention to provide a new and improved applying and/or parting material for metal or non-metal rubber molding forms that will avoid one or more of the disadvantages and limitations of the prior art.

Another object of this invention is to provide a new and improved application for use on the surfaces of metal and non-metal rubber molding forms that will cover same adequately and the interstices in them, so that it will produce a surfacing effect, facilitating the removal of the molded articles formed therein, without causing any deterioration in them or the molding forms, that is of material consequence.

An additional object of this invention is to provide a new and improved fluid application for use on the surfaces of metal rubber molding forms for hot plastic, rubber or rubber-like mixtures, that will withstand the heat effects incurred in the processes of making molds or molded articles therefrom, and at same time tend to produce a finer and smoother finish on the articles.

A further object is to provide a new and improved fluid application for use on the surfaces of molding forms for rubber and plastic articles that will avoid the use of ingredients such as graphite, soap, glycerine and monomer glycols, and oils.

Still another object is to provide a new and improved application for use on the surfaces of metal molding forms for rubber-like mixtures that will adequately wet the surfaces, produce very uniform covering over same and avoid any noticeable chemical or physical effects that would be objectionable.

For a better understanding of the invention of other objects thereof, reference is made to the following description, while the scope and spirit of the invention will appear particularly emphasized in the appended claims.

In order to produce an application, suitable for metallic rubber molding forms, it is necessary to have specific features that will facilitate the process and render the product resulting of proper quality. The following characteristics are important and are detailed herein to indicate the reasons for selecting the ingredients used, followed by an example of a composition that meets such requirements, as an illustration.

An ideal composition of material for use as a working coating for the molding forms mentioned should have extremely effective wetting qualities. This is particularly necessary where the molding forms are surfaced with chromium plate highly polished, that is difficult to wet with ordinary liquids. Another quality is, sufficient viscosity to cover the surfaces uniformly and distribute itself among the crevices of the molding form. Also that it have an inherent high thermal stability. That it will have no appreciable chemical and physical deteriorative effect on the molding form and the molding mixtures poured therein. Other features are desirable also and have been incorporated in the characteristics of the composition cited herein by way of illustration. The ingredients of the composition selected consist of: a polymer of ethylene oxide; diethyltridecanol sodium sulphate solution in water; disodium phosphate; fluorescine sodium; and water. For a more specific proportion of the parts and individual identification, the following has been proven to be satisfactory: An interceptor of polymerized ethylene oxide $$HOCH_2(CH_2OCH_2)_xCH_2OH$$

and belonging to the polyhydroxy alcohol group 100 parts by weight. A wetting agent 3,9-diethyltridecanol-6 sodium sulphate (25% water solution)

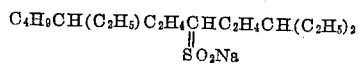

belonging to the alkyl sulphate group.

A buffer salt, caustic soda,
 36 Baumé _____ 0.1 part by weight.
An indicator, fluorescine
 sodium _____ Just a trace.
A solvent, water _____ 400 parts by weight.

The wetting agent itself is of considerable importance. While all such agents regardless of their chemical composition lower the surface tension of water and are usable with ethylene oxide polymers, better results have been obtained with special groups of sodium alkyl sulphates, such as the sodium derivative of 7-ethyl-2-methylundecanol-4 or the sodium sulphate derivative of 3-9-diethyltridecanol-6. The proportion of the wetting agent has to be controlled within specific limits, because too much detracts from the so-called lubricating value of the ethylene oxide polymers and also induces undesirable penetration of the composition into the molding mixture. Too small a proportion would make the composition less effective for the purpose in question. It has been empirically found that the preferred ratio of ethylene oxide polymers (dry weight) to the wetting agent (100% active material) should be 100 to 1.7 to 5%, keeping in mind that the amount of wetting-out agent must be adjustable within this relatively wide range because of the variable degree of dilution which is met with or used, according to the type of molding being carried out during the molding process. This does not mean that the amount of commercial grades of wetting-out agents vary within such range, but that many surface active materials are not perfect (100% pure) but may contain up to 80% of inert materials. The ratio stated above is based on 100% pure ethylene oxide polymers as well as 100% pure surface active agent.

In the process of mixing the ingredients for the composition embodied in this invention, it is desirable from a practical point of view to add an aliquot amount of water as a common solvent or carrier. When the composition is used however on the molding forms, the user may add more water to suit his particular needs. It is not absolutely necessary to restrict the composition to such in liquid or fluid state. The composition may be made in dry form, provided the general principles outlined above are adhered to with the water omitted. In order to inculcate in the final mixture a degree of hydrogen ion concentration sufficient to avoid damage to the expensive molding forms by corrosive action, it is desirable to add a buffer salt. The corrosive action mentioned is due to the fact that commercial ethylene oxide polymer is acidic in character, this being detrimental to the high polish of the molding form. The addition of the buffer salt tends to make the mixture slightly alkaline and thereby eliminates acid corrosion. The alkalinity of the wetting agents usually employed is not sufficiently high, considering the relatively low percentage of wetting agent used in the formula, to counteract the acidity of the commercial grades of the ethylene oxide polymer. This salt may be added in the form of disodiumphosphate or a solution provided that is adjusted by other means, for instance the addition of caustic soda to a pH of over 7.0, preferably from 7.0 to 7.5.

The proper concentration of the hydrogen ion may be visually checked by introducing an indicator dye such as fluorescine sodium, into the composition. The green fluorescence of this dye indicates a pH of 6½ or higher. A yellow color indicates an unsuitable acidic condition.

The composition is applied, when in liquid state which is usually preferable, by swabbing or spraying it onto the molding form where the mixture is to be poured, until the surfaces are completely covered. The molding form is then ready. The ingredients in the compound are so mechanically mixed that they cooperatively function with one another, since in general they are not chemically combined with the exception of water. They do not evaporate when the hot molding mixture contacts them after application to the molding form, or tend to explode or steam up injuriously, in a manner that would interfere with the proper molding of the article. Actually the compound covers the article as well as the molding form surface and lubricates it sufficiently to allow it to be readily removed. It eliminates the necessity for abrading the article to remove rough spots or extra material sticking onto the article, as the finish is practically perfect when the molded material has been removed from the form. It is particularly effective in permitting the removal of pin and flange inserts without requiring hammering or severe force being used. It has been feasible to employ the composition with any common plastic, rubber or synthetic material of a similar nature, and it so fills up the minute interstices in the molding form as to make the finish on the article particularly smooth. It is also unnecessary to "break-in" the molding forms, when this coating is applied to it, no matter how new the form is at the time. The ethylene oxide polymers, especially those of a molecular weight of 3000 to 7500 are hard, translucent, waxy appearing solids which due to their structure possess the property of having a so-termed lubricating value and thermal resistance equal to waxes, and still being soluble in water, and their viscosity characteristics at high temperature is satisfactory to this work.

While but one general form of the invention is described in the specifications, it is not desired to limit this application for patent to this particular form or in any other way otherwise than limited by the scope thereof, as it is appreciated that other forms of construction could be made that would use the same principles and come within the scope of the appended claims:

Having thus described the invention, what is claimed is:

1. A composition for coating molding forms for plastic mixtures ingredientially comprising a wetting agent of the alcohol sulfates group, and an interceptor of the polyhydroxy alcohol group comprising polyethylene glycol combined therewith to produce a body for the mixture and adapted to cover and fill the surfaces and interstices of said forms and intervene between the molding mixture to be poured in and said surfaces, and an alkaline buffer salt for controlling the corrosive condition of the mixture.

2. A composition for coating molding forms for plastic mixtures ingredientially comprising a wetting agent of the alcohol sulfates group, and an interceptor of the polyhydroxy alcohol group comprising polyethylene glycol combined therewith to produce a body for the mixture and adapted to cover and fill the surfaces and interstices of said forms and intervene between the molding mixture to be poured in and said surfaces, an alkaline buffer salt for controlling the corrosive condition of the mixture, and an indicator dye for disclosing the acidic condition of the mixture.

3. A composition for coating molding forms for plastic mixtures ingredientially comprising a wetting agent of the alcohol sulfates group, and an interceptor of the polyhydroxy alcohol group comprising polyethylene glycol combined therewith to produce a body for the mixture and adapted to cover and fill the surfaces and interstices of said forms and intervene between the molding mixture to be poured in and said surfaces, an alkaline buffer salt for controlling the corrosive condition of the mixture, an indicator dye for disclosing the acidic condition of the mixture, and water for dissolving the ingredients of the mixture aforementioned.

4. A composition for coating molding forms for plastic mixtures ingredientially comprising a surface active wetting agent of the alcohol sulfates group, and an interceptor of the ethylene oxide polymer group combined therewith to produce a body for the mixture and adapted to cover and fill the surfaces and interstices of said forms and intervene between the molding mixture to be poured in and said surfaces, an alkaline buffer salt for controlling the corrosive condition of the mixture, an indicator dye for disclosing the concentration of hydrogen ion in the mixture, water for dissolving the ingredients of the mixture aforementioned, said ingredients being proportioned in weight to provide approximately nine parts for the wetting agent, one hundred parts for the ethylene oxide polymer, one tenth of a part for said buffer salt, and a trace for the indicator.

5. A composition for coating molding forms for plastic mixtures ingredientially comprising a surface active wetting agent of the alcohol sulfates group, and an interceptor of the ethylene oxide polymer group combined therewith to produce a body for the mixture and adapted to cover and fill the surfaces and interstices of said forms and intervene between the molding mixture to be poured in and said surfaces, an alkaline buffer salt for controlling the corrosive condition of the mixture, an indicator dye for disclosing the concentration of hydrogen ion in the mixture, water for dissolving the ingredients of the mixture aforementioned, said ingredients being proportioned in weight to provide approximately nine parts for the wetting agent, one hundred parts for the ethylene oxide polymer, one tenth of a part for said buffer salt, a trace for the indicator, and water four hundred parts.

6. A composition for coating molding forms for plastic mixtures ingredientially comprising an ethylene oxide polymer and a wetting agent comprising the sodium sulfate derivative of 7-ethyl-2-methylundecanol-4

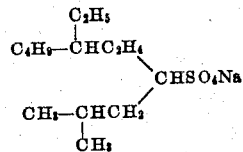

intimately combined together, an indicator to distinguish an excess of acidic characteristic in the mixture, and a buffer salt for providing a predetermined hydrogenion concentration having a pH from 7.0 to 7.5 to prevent corrosion in a molding form for which the composition is used.

7. A composition for coating molding forms for plastic mixtures ingredientially comprising an ethylene oxide polymer and a wetting agent comprising the sodium sulfate derivative of 7-ethyl-2-methylundecanol-4

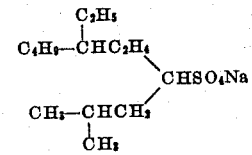

intimately combined together, an indicator to distinguish an excess of acidic characteristic in the mixture, a buffer salt for providing a predetermined hydrogenion concentration having a pH from 7.0 to 7.5 to prevent corrosion in a molding form for which the composition is used.

8. A composition for coating molding forms for plastic mixtures ingredientially comprising an ethylene oxide polymer and a wetting agent comprising the sodium sulfate derivative of 7-ethyl-2-methylundecanol-4

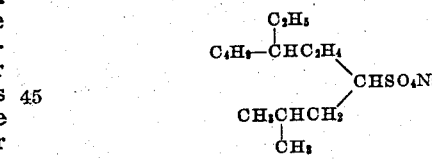

intimately combined together, an indicator to distinguish an excess of acidic characteristic in the mixture, a buffer salt for providing a predetermined hydrogenion concentration having a pH from 7.0 to 7.5 to prevent corrosion in a molding form for which the composition is used, and water for dissolving the ingredients of the mixture aforementioned.

WALTER G. KUNZE.

REFERENCES CITED

The following references are of record in the file of this patent:

UNITED STATES PATENTS

| Number | Name | Date |
|---|---|---|
| 2,282,364 | Kunze et al. | May 12, 1942 |
| 2,309,722 | Wilkes et al. | Feb. 2, 1943 |
| 2,397,338 | Cowling | Mar. 26, 1946 |

OTHER REFERENCES

"Synthetic Organic Chemicals," Carbon and Carbide Chemicals Corporation, 10th ed., Oct. 15, 1940, pages 62, 63, 66 to 68. Copy in Div. 15.

Ellis: "The Chemistry of Synthetic Resins," Reinhold Publishing Corp., 1935, pages 992-993. Copy in Div. 15.